US006114953A

United States Patent [19]

Martin

[11] Patent Number: 6,114,953

[45] Date of Patent: Sep. 5, 2000

[54] AUTOMOTIVE ACCESSORY REMINDER DEVICE

[76] Inventor: John C. Martin, 1131 Lyonhurst St., Birmingham, Mich. 48009

[21] Appl. No.: 09/469,073

[22] Filed: Dec. 21, 1999

[51] Int. Cl.[7] .......... B60Q 1/00

[52] U.S. Cl. .......... 340/457; 340/457.4; 340/309.15; 340/693.5; 340/321

[58] Field of Search .......... 340/457, 457.4, 340/693.5, 309.15, 321

[56] References Cited

U.S. PATENT DOCUMENTS

| | | |
|---|---|---|
| D. 341,378 | 11/1993 | Becker et al. . |
| D. 351,861 | 10/1994 | Anderson et al. . |
| D. 365,600 | 12/1995 | Martin . |
| D. 390,698 | 2/1998 | Martin . |
| D. 394,153 | 5/1998 | Martin . |
| D. 394,746 | 6/1998 | Martin . |
| 1,588,254 | 6/1926 | Matthews . |
| 2,601,838 | 7/1952 | Boates . |
| 2,656,817 | 10/1953 | Jones . |
| 2,912,776 | 11/1959 | Koerber . |
| 3,169,331 | 2/1965 | Herster . |
| 3,829,994 | 8/1974 | Dillon . |
| 3,911,855 | 10/1975 | Haven . |
| 4,593,263 | 6/1986 | Peckworth . |
| 4,886,010 | 12/1989 | Stutzman . |
| 4,942,841 | 7/1990 | Drucker, Jr. . |
| 4,958,454 | 9/1990 | Chan et al. . |
| 5,668,570 | 9/1997 | Ditzik .......... 345/173 |
| 5,705,977 | 1/1998 | Jones . |
| 5,710,545 | 1/1998 | Dunn . |

*Primary Examiner*—Daryl Pope
*Attorney, Agent, or Firm*—Brooks & Kushman P.C.

[57] ABSTRACT

A reminder device for vehicle key rings or the like includes an integrated processor programmable to provide reminder information in a plurality of operating modes comprising mileage, date, parking location, parking meter expiration, event status and lost key recovery assist.

3 Claims, 1 Drawing Sheet

AUTOMOTIVE ACCESSORY REMINDER DEVICE

TECHNICAL FIELD

This invention relates to a reminder device programmable to alert a user as to a vehicle's usage needs.

BACKGROUND ART

John C. Martin's design patents Des. 365,600, issued Dec. 26, 1995, Des. 390,698, issued Feb. 17, 1998, and Des. 394, 153, issued May 12, 1998, disclose an ornamental design for an oil change reminder for key rings. U.S. Pat. No. 5,705, 977, issued Jan. 6, 1998, to James Jones, discloses a memory device which includes a programmable processor to signal a user when a recommended service interval has elapsed.

DISCLOSURE OF INVENTION

A driver's life on today's crowded highways can be a hassle. Initially, your concern turns to excess mileage on a lease, which also warns you of oil change obligations. As you drive about, you sometimes park in a parking deck, and at other times at a parking meter. Remembering your location in the deck and your meter expiration time at the parking meter is another taxing hassle. And, of course, all this traveling about is so that you can keep up with your schedule of events—a schedule which may be adversely impacted if your car keys are lost. These and other problems are solved by my invention which is a hand-held, portable device sufficiently small to be carried about in a pocket or pocket book. The device includes a depressable display bar for selecting a mode of operation and eight depressable buttons for programming the selected mode of operation. A display screen provides a record of the program. In each case the bar and the buttons are manipulated to provide a solution for the problem faced as the user travels about.

Accordingly, it is an object of this to provide a hand-held device for vehicle information which comprises a container defining an exterior surface and an inner cavity, the exterior surface defining a display area for displaying a plurality of illuminatable alpha-numerical digits, a depressable display bar, and a plurality of depressable buttons respectively juxtaposed with the plurality of alpha-numerical digits; and a digital processor in the cavity, electronically in communication with the display bar and the depressable buttons for selectively illuminating the digits so that when the display bar is depressed a mode of operation is selected in accordance with the number of times the display bar is depressed, and when the depressable buttons are depressed selectively, a selected numeral will be displayed by the illuminated digits in the display area indicative of the particularities of the mode selected.

A more specific object of my invention is a reminder device for key rings comprises a container defining an exterior surface and an inner energy source; the exterior surface defining an indicia area, a display area for displaying a plurality of illuminatable digits, a depressable display bar, and a plurality of depressable buttons respectively juxtaposed with the plurality of digits; and a digital processor connected to the energy source and in electronic communication with the display bar and the depressable buttons or selectively illuminating the digits so that when the display bar is depressed once and the depressable buttons are depressed selectively, a selected mileage will be displayed by the illuminated digits in the display area; and when the display bar is depressed twice and the depressable buttons are depressed selectively, selected data will be displayed by the illuminated digits in the display area; and when the display bar is depressed three times and the depressable buttons are depressed selectively, a selected parking location will be displayed by the illuminated digits in the display area; and when the display bar is depressed four times and the depressable buttons are depressed selectively, a selected parking meter expiration will be displayed by the illuminated digits in the display area; and when the display bar is depressed five times and the depressable buttons are depressed selectively, a selected event status tracker will be displayed by the illuminated digits in the display area; and when the display bar is depressed six times and the depressable buttons are depressed selectively, a selected lost keys recovery assist will be displayed by the illuminated digits in the display area.

BEST MODE FOR CARRYING OUT THE INVENTION

Figure 1:
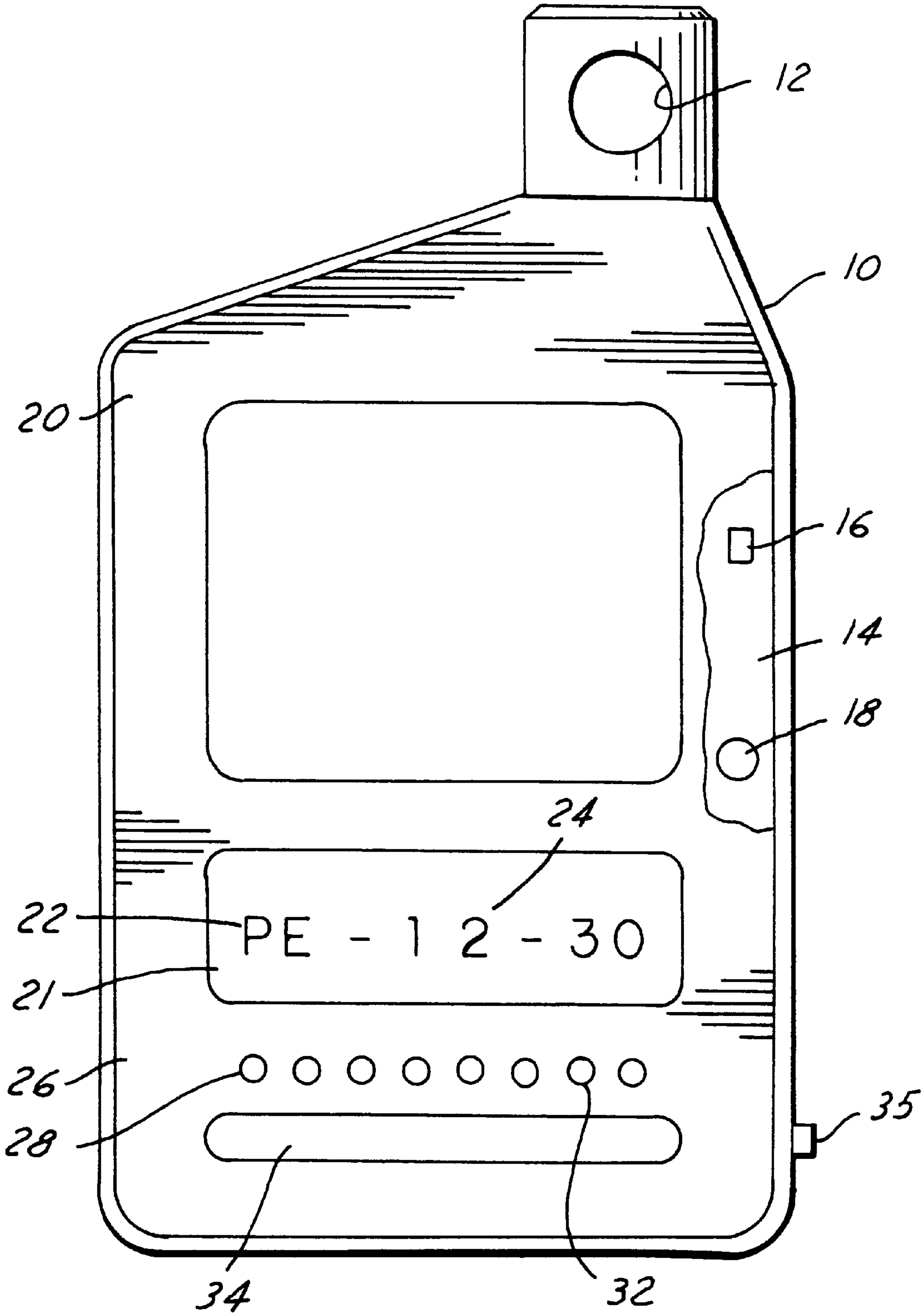
FIG. 1 is a perspective view of the reminder device partially broken away to show a cavity for enclosing a programmable processor and a battery for operating the processor.

With reference to FIG. 1, I show a portable, hand-held vehicle reminder device or container 10. The device is shown in the configuration of an oil can, but could be any shape so long as it is sufficiently portable to be carried about by the vehicle's user. The device may have an opening 12 for attachment to a key ring or pocket book and a cavity 14 accessible by a removable door or the like (not shown). The cavity is usable to store or house a digital microprocessor 16 and a battery 18 for energizing the microprocessor. The device has an exterior surface 20 having an alpha-numeric display area 22 for letters and/or numbers. A plurality of LCDs 21 are positioned for viewing in the display area 22. Some of the LCDs 21 are letters 22 of the alphabet (alpha), while others 24 are numbers (numeric). Each number and each letter is associated with a particular pushbutton 26. For instance, in FIG. 1 pushbutton 28 is associated with the LCD letter P in display area 22 while the pushbutton 32 is associated with the LCD number 3 in the display area 22.

The reminder device 10 has a depressable display bar 34 for selecting one of six data reminder modes. The initial display area 22 changes as the display bar 34 is depressed. To enable these changes, the microprocessor 16 is programmed to provide a reminder displayed in accordance with which pushbutton 26 is pushed after a reminder mode is selected by the number of times bar 34 is depressed. For this purpose, the digital processor 16 is electronically in communication with the display bar 34 and the depressable buttons 26 for selectively illuminating the LCDs. Such illumination will indicate the particularities of the mode selected. A removable tool 35 may be stored in the container 10 and removed as an aid in depressing the eight pushbuttons. The six reminder modes number 1 through 6 will initially indicate the following LCD display in an Initial Display.

Initial Display

| | Reminder Mode | Initial LCD Display |
|---|---|---|
| 1. | Mileage Mode | 00000000 |
| 2. | Data Mode | 01-01-00 |
| 3. | Parking Location Mode | PL00-000 |
| 4. | Parking Meter Expiration Mode | PE-00-00 |
| 5. | Event Status Tracker Mode | P000A000 |
| 6. | Lost Keys Recovery Assist Mode | CALL-000 |

Microprocessor Program

1. Mileage Mode.

To enter the mileage at which you would next like to change your oil, depress the display bar 34 one time. This will activate the LCD area 21. Now, while the LCD area is activated, use the tool 35 located on the bottom of the reminder device to set the LCDs such as 22,24 by depressing the individual switch buttons such as 28 located under the appropriate digit or letter LCD.

Example: Mileage=3000

| Initial LCD | Example |
|---|---|
| 0 0 0 0 0 0 0 0<br>• • • • • • • • | 0 0 0 0 3 0 0 0<br>• • • • • • • • |

2. Date Mode.

To enter the date at which you would next like to change your oil, depress the display bar 34 one additional time. You may now enter date related information into the LCD area just as you did in 1. above.

Example: Date=12/15/2000

| Initial LCD | Example |
|---|---|
| 0 1 - 0 1 - 0 0<br>• • • • • • • • | 1 2 - 1 5 - 0 0<br>• • • • • • • • |

3. Parking Location Mode.

To enter the designated location where you parked your vehicle, depress the display bar 34 one additional time. Into positions 3 and 4 of the LCD area 21, enter the alphabetic portion of the parking space designator, i.e., 01=A, 02-B, 03=C, . . . 26=Z, and into positions 6, 7 and 8 the numeric portion of the parking space designator.

Example: Parking Location=C48

| Initial LCD | Example |
|---|---|
| P L 0 0 - 0 0 0<br>• • • • • • • • | P L 0 3 - 0 4 8<br>• • • • • • • • |

4. Parking Meter Expiration Mode.

To enter the time when the parking meter you are using is set to expire, depress the display bar 34 one additional time. Into positions 4 and 5 of the LCD area 21, enter the hour digits and into positions 7 and 8 enter the minutes digits of the expiration time.

Example: Parking Meter Expiration=12:30

| Initial LCD | Example |
|---|---|
| P E - 0 0 - 0 0<br>• • • • • • • • | P E - 1 2 - 3 0<br>• • • • • • • • |

5. Event Status Tracker Mode.

To enter this mode, depress the display bar 34 one additional time. To enter the planned number of times you desire to do an event, i.e., use your lawn mower before you change the oil, depress the appropriate pushbutton switches 28 under LCD positions 2, 3, and 4. To record the actual number of times you have done the event, depress the appropriate switches under LCD positions 6, 7 and 8.

Example: Planned=25 Actual=15

| Initial LCD | Example |
|---|---|
| P 0 0 0 A 0 0 0<br>• • • • • • • • | P 0 2 5 A 0 1 5<br>• • • • • • • • |

6. Lost Keys Recovery Assist.

To enter a phone number where you could be contacted if your keys were ever lost, depress the display bar 34 one additional time. The LCD area 21 will show "CALL 000". Change the "000" in LCD positions 6, 7 and 8 to the area code of the designated telephone number. Then depress the display bar 34 one additional time and enter into the LCD area the remaining portion of the telephone number.

Example: Phone No.: (248) 123-4567

| Initial LCD | Example |
|---|---|
| C A L L - 0 0 0<br>• • • • • • • • | C A L L - 2 4 8<br>• • • • • • • • |
| 0 0 0 - 0 0 0 0<br>• • • • • • • • | 1 2 3 - 4 5 6 7<br>• • • • • • • • |

It is intended that the reminder device be shipped so that the above instructions, i.e., initial use of the reminder device, sometimes called Oil Change (ALERT)™ are valid and that the first Data Reminder Mode you enter when you depress the display bar is Mileage Mode. If, however, through some accidental jarring of the package, the Data Reminder Mode you first enter is other than Mileage Mode, you may follow the instructions outlined below, herein identified as Subsequent Use of Your Reminder Device.

7. Subsequent Use of Your Reminder Device.

Your reminder device is designed to go into "sleep" mode (the LCD blanks out) when the unit is not being used. To reactivate the LCD to the Data Reminder Mode last displayed, simply depress the display bar 34 below the LCD area 21. With the LCD area 21 reactivated, you can view, or make adjustments to, the data shown in the LCD area. To move to another Data Reminder Mode, simply depress the display bar until the Data Reminder Mode you desire is reached.

Preferably each of the Data Reminder Modes has been preformatted. You may, however, put any numeric data you desire into any of the LCD positions in any of the Data Reminder Modes. For example, if you needed to remember a specific lock combination, i.e., 34-12-20, you could use the Event Status Tracker Mode and simply change the preformatted entry P000A000, to 34-12-20. If the number you needed to remember was greater than 8 digits, you could enter part of the number into one Data Reminder Mode and the remaining part of the number into a different Data Reminder Mode. This in effect expands the utility of this reminder device.

The reminder device has been designed to be handy and easy to use. The six preformatted Data Reminder Modes allow you to easily record some of the most used automotive or vehicle related data. However, you may record into any of the Data Reminder Modes, the information that you feel is most important to you.

8. Changing the Battery.

To change the battery, remove a door or the like on the housing by using a coin or the like in an appropriate slot and replace the used battery with a similar new battery.

The microprocessor 16 may be programmed in accordance with the data reminder modes of this invention as follows:

There are two ways to go for microprocessor 16, an off-the-shelf chip or a custom chip made from scratch in accordance with my specifications. An off-the-shelf microprocessor is preferred. One such device is the Epson Electronics America Inc. microprocessor [EOC 6527 or equivalent]. The chip is custom programmed to provide the foregoing six data reminder modes masked right onto the chip.

Insofar as the "sleep" mode is concerned, the goal is to conserve battery strength. However, my invention contemplates a microprocessor designed to be awake all of the time.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A reminder device for key rings comprising:

a container defining an exterior surface and an inner energy source;

the exterior surface defining an indicia area, a display area for displaying a plurality of illuminatable digits, a depressable display bar, and a plurality of depressable buttons respectively juxtaposed with the plurality of digits; and a digital processor connected to the energy source and in electronic communication with the display bar and the depressable buttons for selectively illuminating the digits so that:

a selected mileage will be displayed by the illuminated digits in the display area when the display bar is depressed once and the depressable buttons are depressed selectively;

selected data will be displayed by the illuminated digits in the display area when the display bar is depressed twice and the depressable buttons are depressed selectively;

a selected parking location will be displayed by the illuminated digits in the display area when the display bar is depressed three times and the depressable buttons are depressed selectively;

a selected parking meter expiration will be displayed by the illuminated digits in the display area when the display bar is depressed four times and the depressable buttons are depressed selectively;

a selected event status tracker will be displayed by the illuminated digits in the display area when the display bar is depressed five times and the depressable buttons are depressed selectively;

a selected lost keys recovery assist will be displayed by the illuminated digits in the display area when the display bar is depressed six times and the depressable buttons are depressed selectively.

2. A reminder device for vehicle key rings or the like comprising:

a container defining an exterior surface and an inner cavity;

the exterior surface defining an indicia area configured to receive a logo for the vehicle, a display area having openings for displaying a plurality of illuminatable digits, a depressable display bar, and a plurality of depressable buttons respectively juxtaposed with the openings for the plurality of digits; and a battery generated digital processor in the cavity in communication with the display bar and the depressable buttons for receiving signals therefrom for selectively illuminating the digits so that:

a selected mileage will be displayed by the illuminated digits in the display area when the display bar is depressed once and then the depressable buttons are depressed selectively;

selected date related information will be displayed by the illuminated digits in the display area when the display bar is depressed twice an initial date mode will be displayed in the display area after which when the depressable buttons are depressed selectively;

a selected first partial parking location will be displayed by the illuminated digits in one portion of the display area and a selected second partial parking location will be displayed in another portion of the display area when the display bar is depressed three times an initial parking location mode will be displayed in the display area after which when the depressable buttons are depressed selectively, a selected parking meter expiration will be displayed by the illuminated digits in the display area when the display bar is depressed four times an initial parking meter expiration mode will be displayed in the display area after which when the depressable buttons are depressed selectively;

a selected event target will be displayed by the illuminated digits in one portion of the display area and a status of the event target will be displayed in another portion of the display area when the display bar is depressed five times an initial target status will be displayed in the display area after which when the depressable buttons are depressed selectively; and when the display bar is depressed six times an initial CALL will be displayed in one portion of the display area after which when the depressable buttons are depressed selectively an area code will be displayed in another portion of the display area and then after the display bar is depressed an additional time and the depressable buttons are depressed selectively, a telephone number in the area code as a lost keys recovery assist will be displayed by the illuminated digits in both portions of the display area.

3. A reminder device for vehicle key rings comprising:

a container defining an exterior surface and an inner energy source;

the exterior surface defining an indicia area, a display area for displaying a plurality of illuminatable digits, a depressable display bar, and a plurality of depressable buttons respectively juxtaposed with the plurality of digits; and a digital processor connected to the energy source and in electronic communication with the display bar and the depressable buttons for selectively illuminating the digits so that:

a selected mileage will be displayed by the illuminated digits in the display area when the display bar is depressed in one manner and the depressable buttons are depressed selectively; and selected data will be displayed by the illuminated digits in the display area when the display bar is depressed in another manner and the depressable buttons are depressed selectively;

the selected data to be displayed taken from a group of data consisting of:

a selected parking location to be displayed by the illuminated digits in the display area when the display bar is depressed a first number of times and the depressable buttons are depressed selectively;

a selected parking meter expiration to be displayed by the illuminated digits in the display area when the display bar is depressed a second number of times and the depressable buttons are depressed selectively;

a selected event status tracker to be displayed by the illuminated digits in the display area when the display bar is depressed a third number of times and the depressable buttons are depressed selectively; and a selected lost keys recovery assist to be displayed by the illuminated digits in the display area when the display bar is depressed a fourth number of times and the depressable buttons are depressed selectively.

* * * * *